US006651111B2

(12) United States Patent
Sherman et al.

(10) Patent No.: US 6,651,111 B2
(45) Date of Patent: Nov. 18, 2003

(54) SYSTEM AND METHOD FOR MANAGING A SERIAL PORT

(75) Inventors: Roman Sherman, Bellevue, WA (US); Scott R. Shell, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 428 days.

(21) Appl. No.: 09/788,125

(22) Filed: Feb. 16, 2001

(65) Prior Publication Data

US 2002/0147853 A1 Oct. 10, 2002

(51) Int. Cl.$^7$ .......................... G06F 13/00; G06F 3/00; G06F 9/46; H04Q 7/22

(52) U.S. Cl. ..................... 710/14; 710/12; 710/29; 710/33; 710/52; 710/53; 709/200; 709/201; 709/310

(58) Field of Search .................. 710/12, 14, 29, 710/33, 52, 53; 709/200, 201, 310

(56) References Cited

U.S. PATENT DOCUMENTS

| | | | | |
|---|---|---|---|---|
| 4,651,291 A | * | 3/1987 | Nishimura | 702/162 |
| 5,295,156 A | * | 3/1994 | Heep et al. | 375/222 |
| 5,923,443 A | * | 7/1999 | Nykanen et al. | 358/442 |
| 6,009,472 A | * | 12/1999 | Boudou et al. | 709/232 |
| 6,263,384 B1 | * | 7/2001 | Yanase | 710/53 |
| 6,421,527 B1 | * | 7/2002 | DeMartin et al. | 455/67.13 |

OTHER PUBLICATIONS

Ludwig, et al, *Optimizing the End–to–End Performance of Reliable Flows Over Wireless Links*; R. Ludwig, A. Konrad and A.D. Joseph; *Proceedings of the Fifth annual ACM/IEEE International Conference on Mobile Computing and networking*; 1999, pp. 113–119.

Chou et al, *Synthesis of the Hardware/Software Interface in Microcontroller–Based Systems*; P. Chou, R. Otega and G. Borriello; *Proceedings of the 1992 IEEE/ACM International Conference on Computer–Aided Design*, 1992, pp. 448–495.

(List continued on next page.)

*Primary Examiner*—Kim Huynh
*Assistant Examiner*—Tammara Peyton
(74) *Attorney, Agent, or Firm*—Brett A. Hertzberg; Merchant & Gould P.C.

(57) ABSTRACT

The present invention provides for a virtual serial port (VSP) situated between a serial port in a mobile electronic device, applications that require a serial port connection handle, and other applications that require command-mode access to the serial port. Data-communication applications (e.g. web browsing, e-mail, etc.) connect to the serial port through the VSP. The VSP creates a virtual connection handle that is returned to the application. Command-mode requests (e.g., short messaging requests) are received by the hardware abstraction layer, translated into command-mode messages (e.g., AT commands) and placed in a queue. The VSP multiplexes the serial port between the currently-open data communication session (data-mode) and command-mode messages by periodically suspending the currently-open connection and processing one or more command-mode messages that are in the queue. A buffer continually stores incoming data while the data communication session is suspended. The VSP uses a heuristic calculation to determine the maximum time interval for which the data-communication session can be interrupted. The heuristic calculation takes a percentage of a time-quantum (e.g. 0.5 seconds) based upon the ratio of an average bit rate for air communication (e.g. 7000 bits/sec) and a bit rate for the serial port (e.g. 152,000 bits/sec). This ensures that data-communications are not interrupted for a time interval long enough to result in lost data-packets. The parameter for the time quantum and other parameters may be statically or dynamically adjusted to account for a finite buffer size in the hardware.

20 Claims, 12 Drawing Sheets

OTHER PUBLICATIONS

Ran et al, *Structuring Interfaces*; A. Ran and J. Xu; *Joint Proceedings of the Second International Software Architecture Workshop (ISAW–2) and International Workshop on Multiple Perspectives in Software Development (Viewpoints '96) on SIGSOFT '96 workshops*, 1996, pp. 39–43.

Liu et al, *A Mobile Virtual–Distributed System Architecture for Supporting Wireless Mobile Computing and Communications*,; G.Y. Liu, A. Marlevi, and G.G. Maguire; *Wireless Networks* 2, 1 (Jan. 1996), pp. 77–86.

* cited by examiner

SYSTEM AND METHOD FOR MANAGING A SERIAL PORT

FIELD OF THE INVENTION

The present invention relates generally to computer software, and more particularly to serial port management.

BACKGROUND

Serial port communications are commonly used in a computing devices or computing systems. The physical connection to the serial port in a computing device or system is established by hardware such as direct cabling, modems, network interface devices, and other transmission devices. Although the physical connection is handled by hardware, the connection between the serial port and an application on the computing device is often handled by software.

Software application programs request a handle from the hardware in order to establish a connection. A hardware interface communicates with the hardware to request the handle. The hardware returns the handle to the hardware interface. The hardware interface passes the handle to the application program. Once the application program receives the handle, the application program manages control of the handle until the connection is terminated. The application program uses the handle to transfer and receive data.

SUMMARY

The present invention is directed at providing a system and method for managing a serial port.

According to one aspect of the invention, the method for managing a serial port provides for a virtual serial port that establishes data communication connections between the physical serial port and an application program. The virtual serial port periodically suspends the physical connection between the data communication session so that command messages may be sent to and processed by the physical serial port.

According to another aspect of the invention, the method for managing a serial port includes a virtual serial port that periodically suspends a data communication session. The suspended data communication session is resumed within a time period determined by a heuristic calculation. While the data communication session is suspended, command messages are communicated to the serial port.

In yet another aspect of the invention a data communication session is suspended for a time period determined by various criteria including the communication channel bit rate, the serial port communication rate and a time quantum. Since the serial port communication rate is usually much greater than the channel bit rate, data communication sessions can be periodically suspended without losing the connection. By multiplexing between the data communication session and the command-mode, multiple functions can be accomplished at the same time.

According to another aspect of the invention, a virtual serial port manager provides for serial port management between application programs and a physical serial port in a portable electronic device. In one example, the portable electronic device is a wireless telephone device such as a cellular telephone. In another example, the portable electronic device is a GSM type of cellular telephone. In still another example, the portable electronic device is a personal information manager (PIM) type of device. Other electronic devices that operate in an AT-command environment may also utilize the present invention for serial port management.

Briefly described, the present invention provides for a virtual serial port (VSP) that is situated between a serial port in a mobile electronic device, applications that require a serial port connection handle, and other applications that require command-mode access to the serial port. Data-communication applications (e.g. web browsing, e-mail, etc.) connect to the serial port through the VSP. The VSP creates a virtual connection handle that is returned to the application. Command-mode requests (e.g., short messaging requests) are received by the hardware abstraction layer, translated into command-mode messages (e.g., AT commands) and placed in a queue. The VSP multiplexes the serial port between the currently-open data communication session (data-mode) and command-mode messages by periodically suspending the currently-open connection and processing one or more command-mode messages that are in the queue. A buffer continually stores incoming data while the data communication session is suspended. The VSP uses a heuristic calculation to determine the maximum time interval for which the data-communication session can be interrupted. The heuristic calculation takes a percentage of a time-quantum (e.g., 0.5 seconds) based upon the ratio of an average bit rate for air communication (e.g., 7000 bits/sec) and a bit rate for the serial port (e.g., 152,000 bits/sec). This helps to ensure that data-communications are not interrupted for a time interval long enough to result in lost data-packets. The parameter for the time quantum and other parameters may be statically or dynamically adjusted to account for a finite buffer size in the hardware.

According to one aspect of the present invention, a system of managing a port includes an interface that establishes a data-connection to the port. Another interface receives command-requests and stores command-messages in a buffer. The interface periodically suspends the established data-connection with the port if command-messages are located in the buffer. The interface sends as many command-messages from the buffer to the port as can be executed within a prescribed time interval and subsequently resumes the connection with the port. The prescribed time interval may be determined by a heuristic calculation.

According to another aspect of the present invention, a managed port is provided. The port manager generates a virtual handle when a data-connection is established. A heuristic calculation is used to determine when to switch between a data-mode and a command-mode. Data is routed between the port and the virtual handle when the operating mode is the data-mode. Command-messages are placed in a buffer. Several (possibly, none) command messages in the buffer are selected. The selected command messages from the buffer are sent to the port when the operating mode is the command-mode.

According to yet another aspect of the present invention, a computer readable medium having computer executable instructions for managing a port connection is provided. A call-mode is activated when a data-connection is established. The call-mode is deactivated when the data-connection is terminated. A heuristic calculation is used to determine a time interval. Data is routed between an application and the port during the time interval when the operating mode is the call-mode. The data-connection is suspended for the duration of the time interval when the operating mode is the call-mode. The command-mode is activated either when the call-mode is deactivated or when the data-connection is suspended. Command-messages that are awaiting processing when the operating mode is the command-mode are then processed. The suspended data connection is resumed after the completing the processing of command messages when the call-mode is active.

These and various other features and advantages, which characterize the present invention, will be apparent from a reading of the following detailed description in conjunction with the associated drawings.

DETAILED DESCRIPTION

The present invention is directed at providing a method and system for dynamically interfacing with a serial port. A "virtual", or artificial port interface moderates data and/or voice communication sessions between various application programs and devices that communicate to and/or through the serial port. In one embodiment of the invention, the virtual serial port is implemented in a mobile device.

Figure 1:
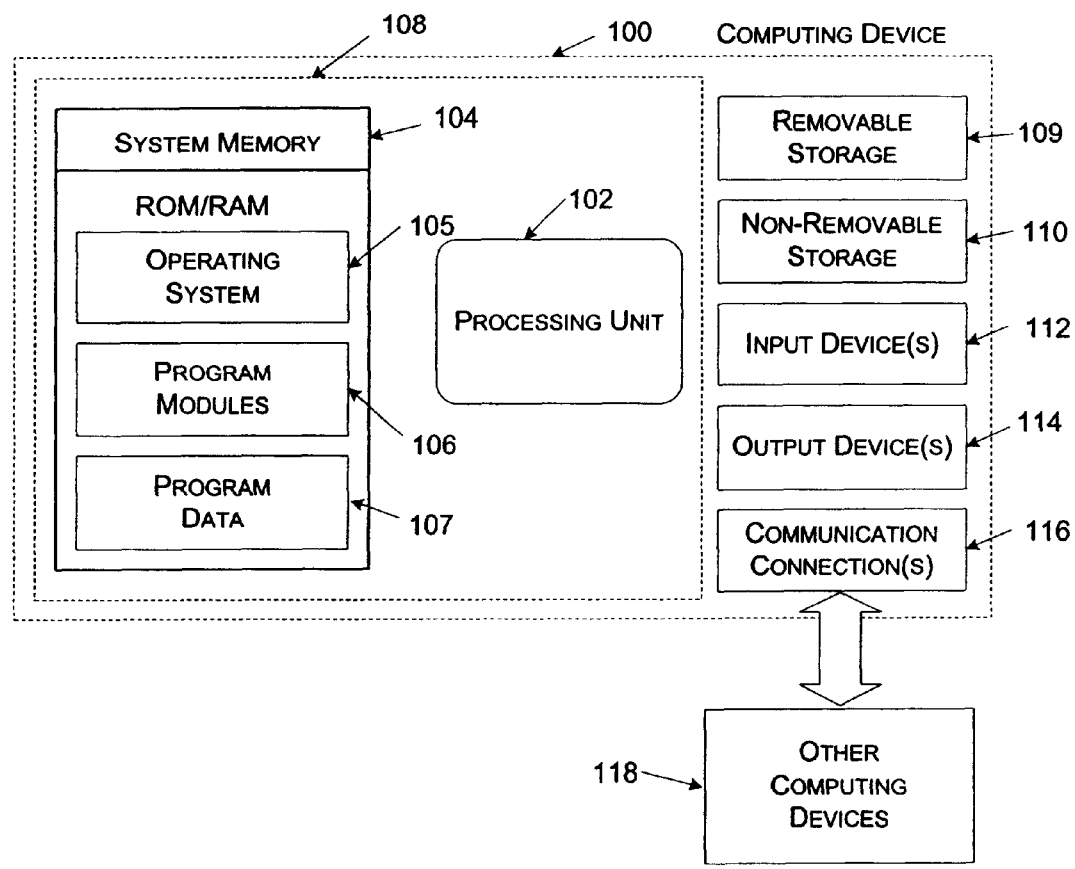
FIG. 1 is a functional block diagram of one computing device adapted to implement one embodiment of the invention.

Referring to FIG. 1, an exemplary system for implementing the present invention includes a computing device, such as computing device 100. In a basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more program modules 106, and may include program data 107. This basic configuration is illustrated in FIG. 1 by those components within dashed line 108.

Computing device 100 may also have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and non-volatile, removable and non-removable media implemented in any method or technology for storage of information, such as computer readable instructions, data structures, program modules or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. All these devices are known in the art and need not be discussed at length here.

Computing device 100 also contains communications connection(s) 116 that allow the device to communicate with other computing devices 118, such as over a network. Communications connection(s) 116 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
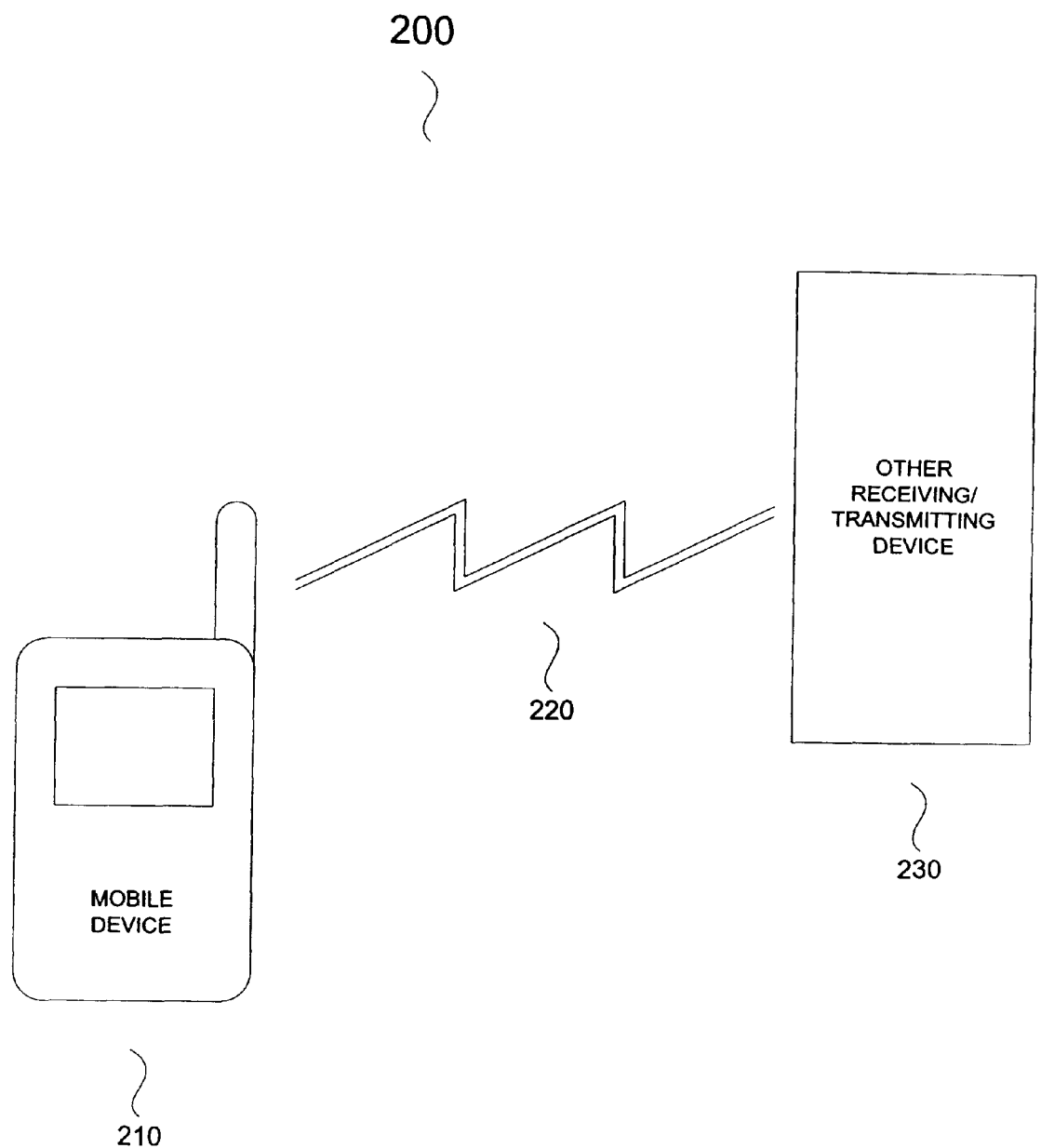
FIG. 2 illustrates an operating environment for one embodiment of the invention.

FIG. 2 illustrates an example of an operating environment (200) in which the invention may be implemented in a mobile device (210). The mobile device (210) is capable of communicating through a communication channel or channels (220) to other communication devices (230).

The operating environment (200) shown in FIG. 2 is only one example of a suitable operating environment and is not intended to suggest any limitation as to the scope of use, or functionality of the invention. Other well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

Figure 3:
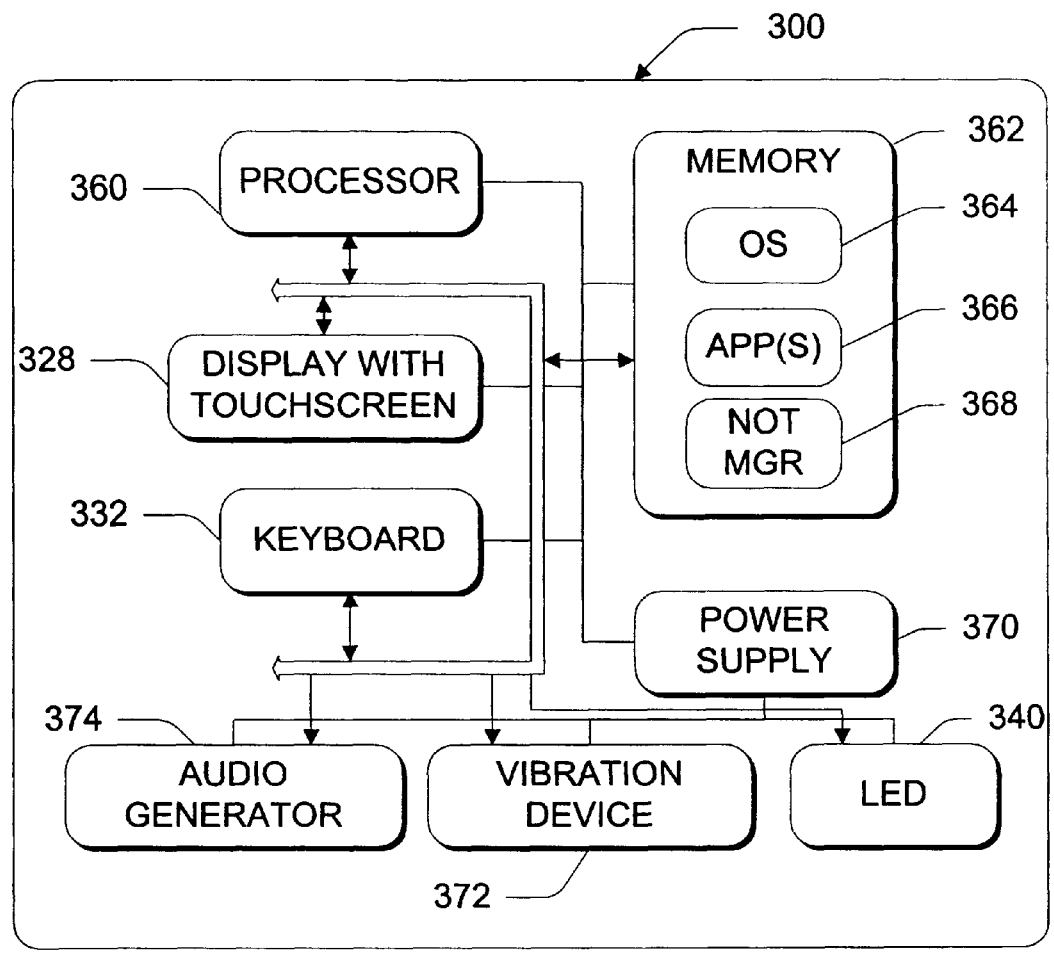
FIG. 3 is a functional block diagram of an exemplary mobile computing device.

FIG. 3 illustrates an example of a mobile computing device (300). Example mobile computing devices include, but are not limited to: a mobile telephone, a wireless radio transceiver, a personal information manager (PIM), an electronic organizer, or any other type of handheld computing device. The mobile computing device (300) includes a processor (360), a memory (362), a display (328), and a keyboard (332). The display (328) may include a touch-sensitive screen (touch-screen). The memory (362) generally includes both a volatile memory (e.g., RAM) and a non-volatile memory (e.g., ROM, PCMCIA cards, etc.). An operating system (364) is resident in the memory (362) and executes on the processor (360). The mobile computing device (300) includes an operating system, such as the Windows® CE operating system from the Microsoft Corporation or another operating system.

One or more application programs (366) are loaded into the memory (362) and executed by the operating system (364). Examples of application programs include email programs, scheduling programs, PIM (personal information management) programs, word processing programs, spreadsheet programs, Internet browsing programs, as well as others. The mobile computing device (300) also has a notification manager (368) loaded in the memory (362), which executes on the processor (360). The notification manager (368) handles notification requests from the applications (366).

The mobile computing device (300) has a power supply (370), which is implemented as one or more batteries. The power supply (370) may further include an external power source that overrides or recharges the batteries, such as an AC adapter or a powered docking port or cradle.

The mobile computing device (300) is also shown with three types of external notification mechanisms: an LED (340), a vibration device (372), and an audio generator (374). These devices are directly coupled to the power supply (370) so that when activated, they remain on for the duration dictated by the notification mechanism even though the mobile computing device processor and other components might shut down to conserve battery power. The LED (340) preferably remains on indefinitely until the user takes action. The current versions of the vibration device (372) and audio generator (374) use too much power for today's mobile computing device batteries, and so they are configured to turn off when the rest of the system does or at some finite duration after activation.

Figure 4:
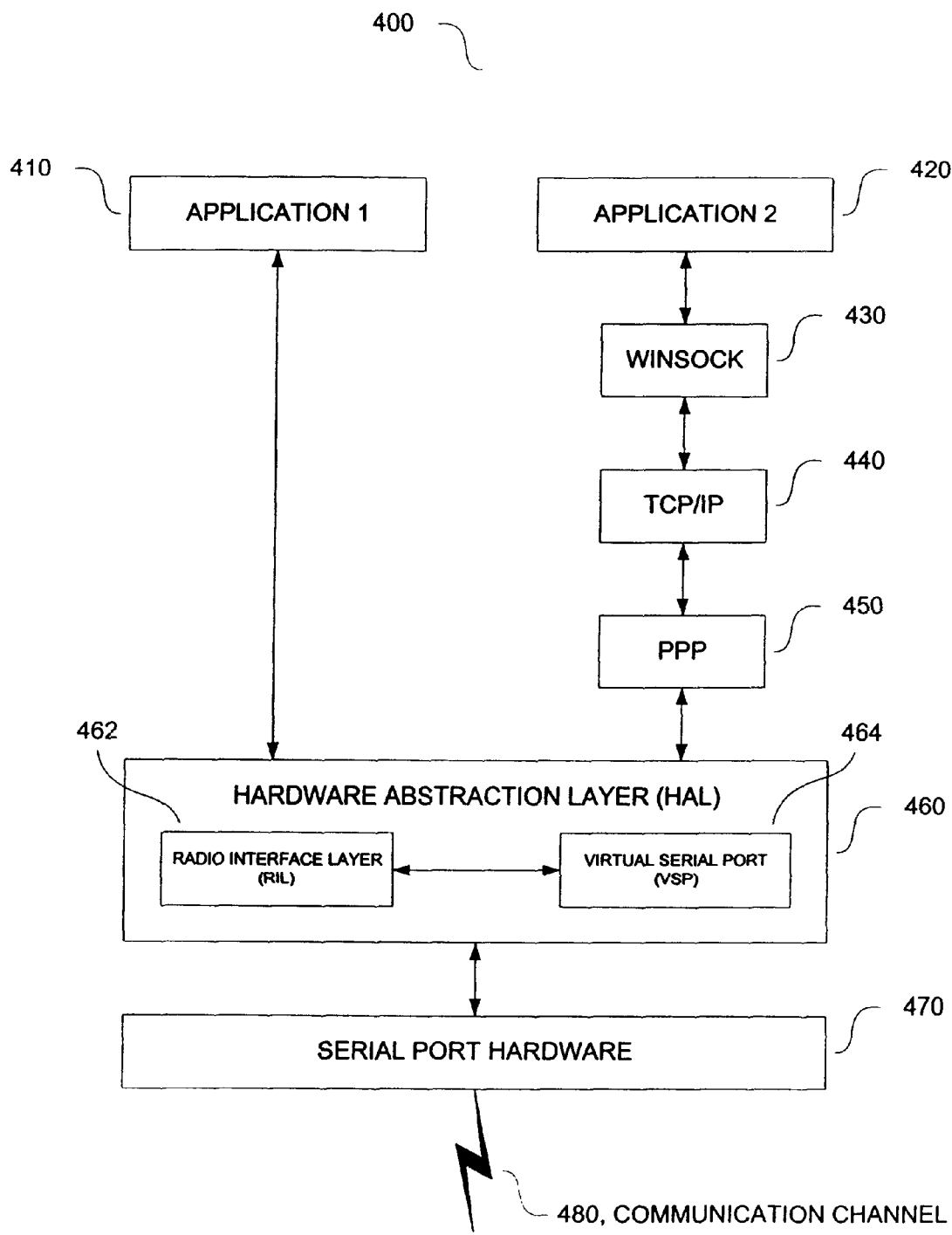
FIG. 4 is a block diagram illustrating various functional components in an exemplary serial port system.

An example illustration of a telephony system is depicted in FIG. 4. Application programs (410, 420) communicate through the HAL (460) to the serial port hardware (470). A first type of application program (410, Application 1) communicates directly with the HAL (460). A second type of application program (420, Application 2) communicates to the HAL (460) through a TCP/IP stack.

In one embodiment, an application program interface (API) such as for the Windows® CE operating system from the Microsoft Corporation (WINSOCK) is used to communicate between the application program (420) and the HAL (460). Sockets are set up through a WINSOCK call by the application program. Application 2 (420) communicates with send and receive buffers that are allocated by the socket call. The WINSOCK layer encapsulates outgoing messages into TCP/IP messages through the TCP/IP layer (440). The TCP/IP layer (440) encapsulates the messages for serial communication through a point-to-point protocol (PPP). The PPP layer (450) transfers outgoing datagrams to the HAL (460) for communication over the serial port hardware (470).

The HAL (460) communicates with the serial port hardware (470) to establish connections and route incoming and outgoing data packets. The serial port hardware (470) transmits and receives data packets from a communication channel (480). The communication channel may be any suitable communication interface such as, for example, a wireless communication channel used in cellular communications.

The HAL (460) includes a radio interface layer (462, RIL) and a virtual serial port (464, VSP). In one embodiment of the invention, the RIL (462) and the VSP (464) are integrated into a common interface program. In another embodiment of the invention, the RIL (462) and the VSP (464) are separate interface programs.

Figure 5:
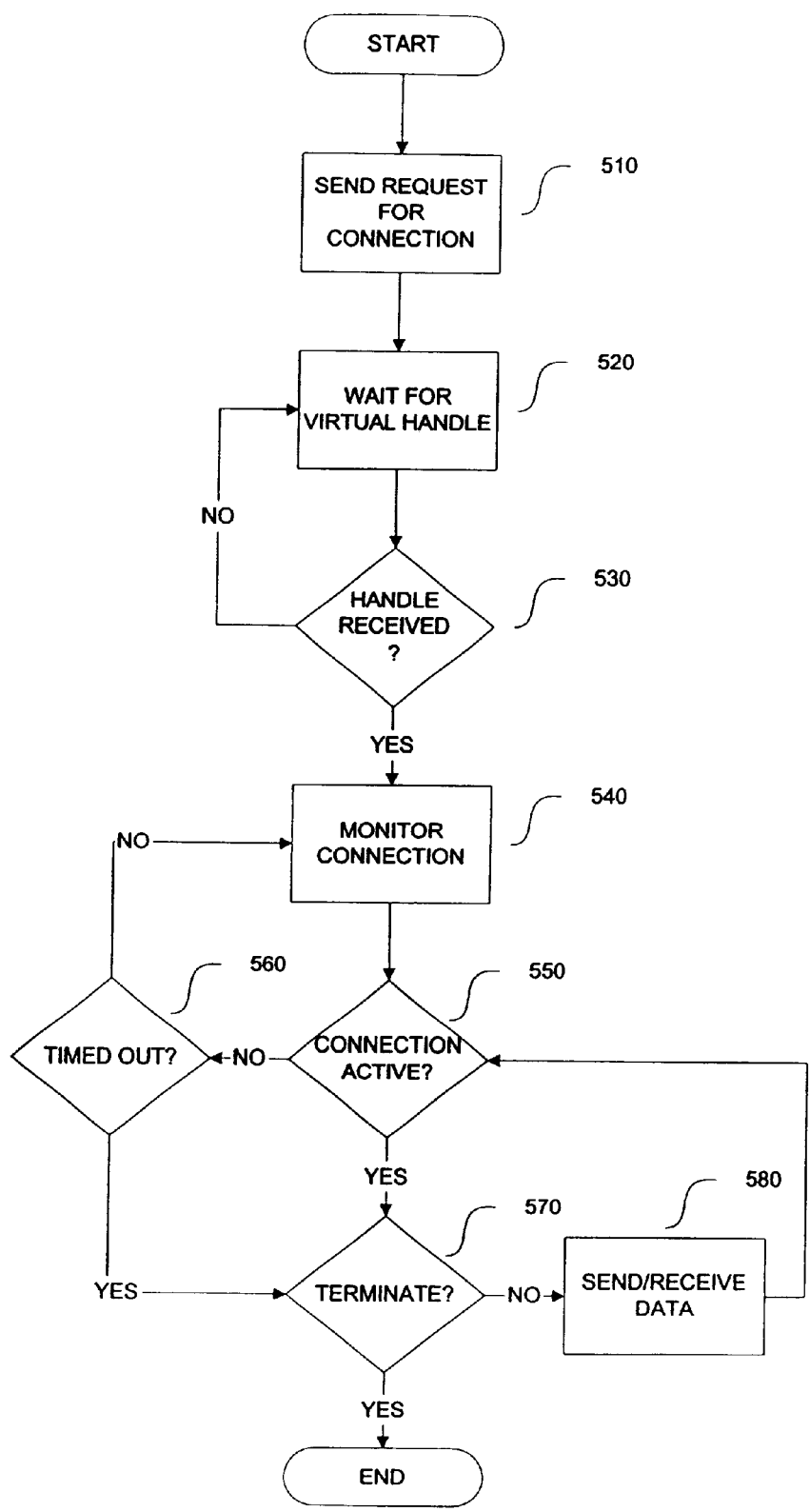
FIG. 5 illustrates the operation of an exemplary application in the system shown in FIG. 4.

The operation of an exemplary application program that establishes a connection and communicates through the HAL is shown in FIG. 5. Processing begins at block 510, where the application program sends a request for a serial port connection through an application program interface such as a WINSOCK open command. Processing proceeds to block 520 where the application program waits for acknowledgement of the open connection (wait for virtual handle).

At block 530, the processing determines if a handle has been received. Processing will continue from block 530 to block 520 until it is determines that a handle has been received. Once a handle is received, processing proceeds from block 530 to block 540 where the connection is monitored.

While the connection is monitored, processing proceeds to block 550 where it is determined if the connection is active. If the connection is not active, processing proceeds to block 560, otherwise processing proceeds to block 570. At block 560, it is determined if the process has timed out. If the processing has not timed out, then processing proceeds back to block 540. Otherwise, processing proceeds to block 570.

At block 570, it is determined if the data communication has terminated. The port connection can be terminated by a request made by the application program. Also, the port connection can be terminated based on other criteria such as, for example, a time out condition as detected at block 560. If data communications have not terminated, then processing continues to block 580 where data is sent and/or received by the application program as is necessary.

As described above, data communications are generally established by requesting a serial communication port by opening a new data call, and obtaining a serial port handle in response to the port request. After the serial port handle is received, all data is transmitted to and received from the serial port handle. At the end of the data communication, the call is terminated.

Voice telephony calls are established using a command mode to initiate the call (e.g., an ATD command). After the connection is established, the voice telephone call communicates directly with the physical connection without using any serial port resources. However, other voice telephony systems may communicate using an Internet based protocol (e.g., web-phone). The Internet (or web) based telephony applications will connect to the serial port in a similar way to the data communication connections previously described above.

Figure 6:
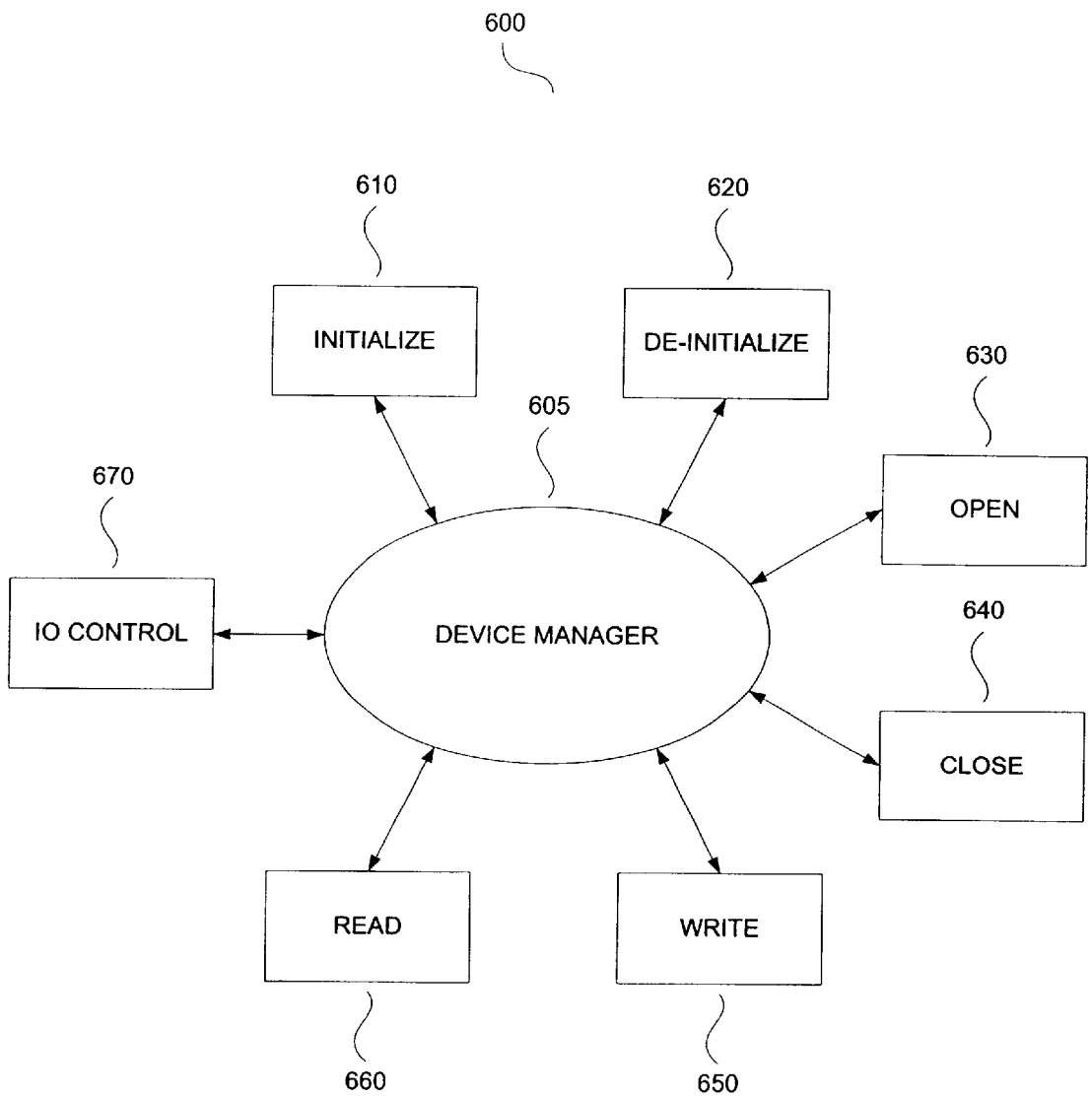
FIG. 6 is a diagram illustrating various components in a device manager.

FIG. 6 illustrates a device manager system (600) containing a set of exemplary device drivers and services. Generally, device drivers consist of routines that are executed at various stages in an input/output (I/O) request. Services may be requested by an application program through an operating system (OS) call. An application program interface (API) call is redirected to the device manager where the device manager performs the various device operations. For the serial port hardware described previously, the device manager performs the operations required to establish connections, close connections, and route information to and from the serial port.

Starting at the device manager (605), an INITIALIZE routine (610) is provided. The initialize routine initializes the VSP driver. The INITIALIZE routine (610) registers the routines associated with the device driver with the I/O system of the operating system. A DE-INITIALIZE routine (620) is invoked when the device driver is unloaded by the operating system.

The device manager initiates an OPEN routine (630) in response to an API request to open a new serial port connection. In one example of the present invention, the OPEN routine (630) will return a handle to the device manager when a call is already in progress. In this example, the OPEN routine fails and will not return a handle unless a call is in progress since the VSP cannot be opened without a valid data channel. The application program initiates an API request to close the connection when the currently-open connection is no longer required. The device manager responds to the API request by initiating the CLOSE routine (640), which releases the handle that was previously in use by the application program.

The device manager initiates a WRITE routine (650) and a READ routine (660) in response to API requests to read and write to a specified handle. In one example of the present invention, the read and write requests are routed to the physical serial port unless the physical serial port is unavailable. When the physical serial port is unavailable, the read and write requests are blocked. The physical serial port is unavailable when a command-mode request is being performed. Examples of command-mode requests include, but are not limited to, a request to: check the signal strength of a connection, check the status of the network, perform a network operation, as well as others.

The device manager initiates an IO CONTROL routine (670) in response to an API request for device I/O control that is directed to a VSP handle. When the serial port is in a data-mode, the IO CONTROL routine (670) redirects the I/O control request to the physical serial port. However, when the serial port switched into the command-mode, the I/O control request is blocked until the serial port is switched back into data-mode. As will be discussed later, setting the data terminal ready (DTR) line in the physical serial port low will switch a current data connection to the serial port from the data-mode to the command-mode. I/O control operations that attempt to modify the state of the DTR line of the serial port are failed by the VSP so that external modules are prevented from switching the physical serial port out of data-mode.

The device manager maps API calls to the INILIZE, DE-INITIALIZE, OPEN, CLOSE, READ, WRITE, and IO CONTROL routines. In one example of the invention, the VSP is only accessible by application programs when a data connection is already in progress. In this example, the OPEN, CLOSE, READ, WRITE, and IO CONTROL routines will fail until a data call is established. After a data call is established, the routines (and corresponding device manager API calls) will begin to succeed.

The VSP acts as a multiplexer that switches a connection between the physical serial port in the mobile electronic device and various applications that operate in at least two modes. Applications that are sending data communication streams such as Internet browsing, voice communication, and mail types of applications are operating in a data-mode. Applications that request information from the hardware system or the network, such as, for example, signal strength in a mobile telephone, network status, or other hardware related requests are operating in a command-mode. As stated previously, a wireless mobile device includes a HAL that includes both a RIL and a VSP. An overview of exemplary processing operations for command-mode messages is shown in FIG. 7.

Figure 7:
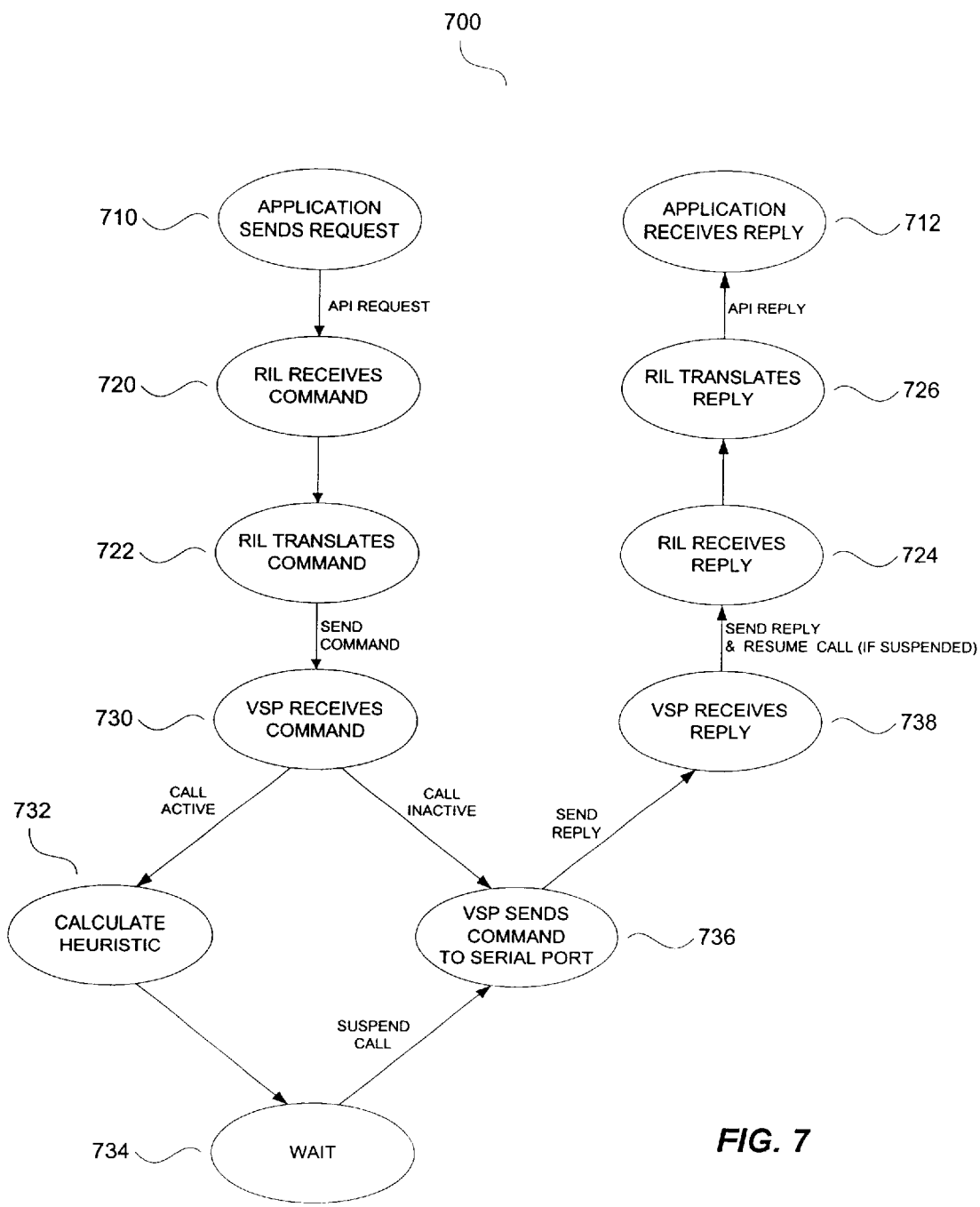
FIG. 7 is a flow diagram illustrating the operation of an exemplary system including a virtual serial port.

As shown in FIG. 7, command-messages are sent to the HAL by an application program sending a command-mode request (710) through an API call (REQUEST). The RIL in the HAL receives the command-mode request (720) and translates the request (722) into another format (e.g. AT Command format) that is suitable for the serial port hardware (or hardware driver). The RIL sends the command message to the VSP, either as a direct message or through other means such as a buffer, queue or other shared memory area. In one embodiment, the RIL and the VSP share a queue that is accessed based upon at least one criterion such as priority, most recent request, as well as other criteria. The VSP receives the command message (730) and processes the message based upon the current activity in the serial port.

When a call is not currently active (CALL INACTIVE), the VSP sends the formatted command message directly to the serial port (736) and awaits a reply (when required) from the serial port. However, the VSP does not immediately send the command message to the serial port when a call is active (CALL ACTIVE). Instead, the VSP uses a heuristic calculation (732, CALCULATE HEURISTIC) to determine whether or not the current call can be interrupted a sufficient amount of time to handle the command message. If so, the current active call is suspended (SUSPEND CALL) and the command message is sent to the serial port (736).

Otherwise, the VSP then waits (734) until sufficient suspension time is available to process the command message before suspending the currently active call.

The VSP awaits a reply message from the serial port if appropriate. The VSP receives a reply (738) message after the serial port sends the reply message (SEND REPLY). Subsequently, the VSP sends the reply message to the RIL (SEND REPLY) and resumes any previously suspended call (RESUME CALL). The RIL receives the reply message (724, RIL RECIEVES REPLY) from the VSP and translates the reply into another format (726, RIL TRANSLATES REPLY). The RIL sends the translated message back to the application program (API REPLY) where it is received (712, APPLICATION RECEIVES REPLY).

As stated previously, a call is suspended by the VSP based on a heuristic calculation. The RIL requests the VSP to temporarily interrupt data communication (e.g., suspend the call) so that the RIL or VSP can perform various operations with the serial port (e.g. cellular network operations). In one example, the data communication interruption is achieved by switching the physical serial port into a command-mode by setting the DTR line low. Once in the command-mode, requests, such as AT commands, may be sent to the serial port. Replies from the serial port are then received from the serial port in a format such as AT responses and/or notifications. After the serial port command-mode request is complete, the physical serial port is returned back into the data communication mode by executing a command message such as ATO.

Since the physical serial port is switched into the command-mode by setting the DTR line low, the IO CONTROL handler cannot be permitted to manipulate the DTR line. By disabling access to the DTR line, the VSP is free to operate properly. Data communications over the VSP cannot be interrupted for long time intervals since receive and send buffers are of a limited size. In a cellular telephone type of device, the send and receive buffers are part of the cellular telephone hardware. In order to prevent lost data, the data communication connection may be interrupted for short periods of time as determined by a heuristic calculation. The VSP uses the following heuristic to determine the maximum time the data link can be interrupted for:

$$MaxInterruptTime = TimeQuantum \times \left(1 - \frac{EffectiveAirBitRate}{SoftwareToModuleBitRate}\right),$$

where

MaxInterruptTime is the maximum time that data communications can be interrupted for;

TimeQuantum is the quantum of time taken as a basis of calculation;

EffectiveAirBitRate is the average bit rate at which data is sent over the air (over the last TimeQuantum); and SoftwareToModuleBitRate is the bit rate at which data is communicated to the cellular module.

The key to the heuristic is the fact that SoftwareToModuleBitRate is commonly much higher than EffectiveAirBitRate. For example, common serial port connections can transmit and receive data at 152,000 bits/second. However, common airwave communications stream data at roughly 7,000 bits/second. Thus, the SoftwareToModuleBitRate of 152,000 bits/second is substantially higher than the EffectiveAirBitRate of 7,000 bits/second. The physical serial port is predominately idle through each TimeQuantum, since roughly 5% of the time is utilized for data communication. Thus, in this example, roughly 95% of the TimeQuantum is available for command messages to interrupt the data communication. In one example of the present invention, a TimeQuantum of 0.5 seconds is used.

Figure 8:
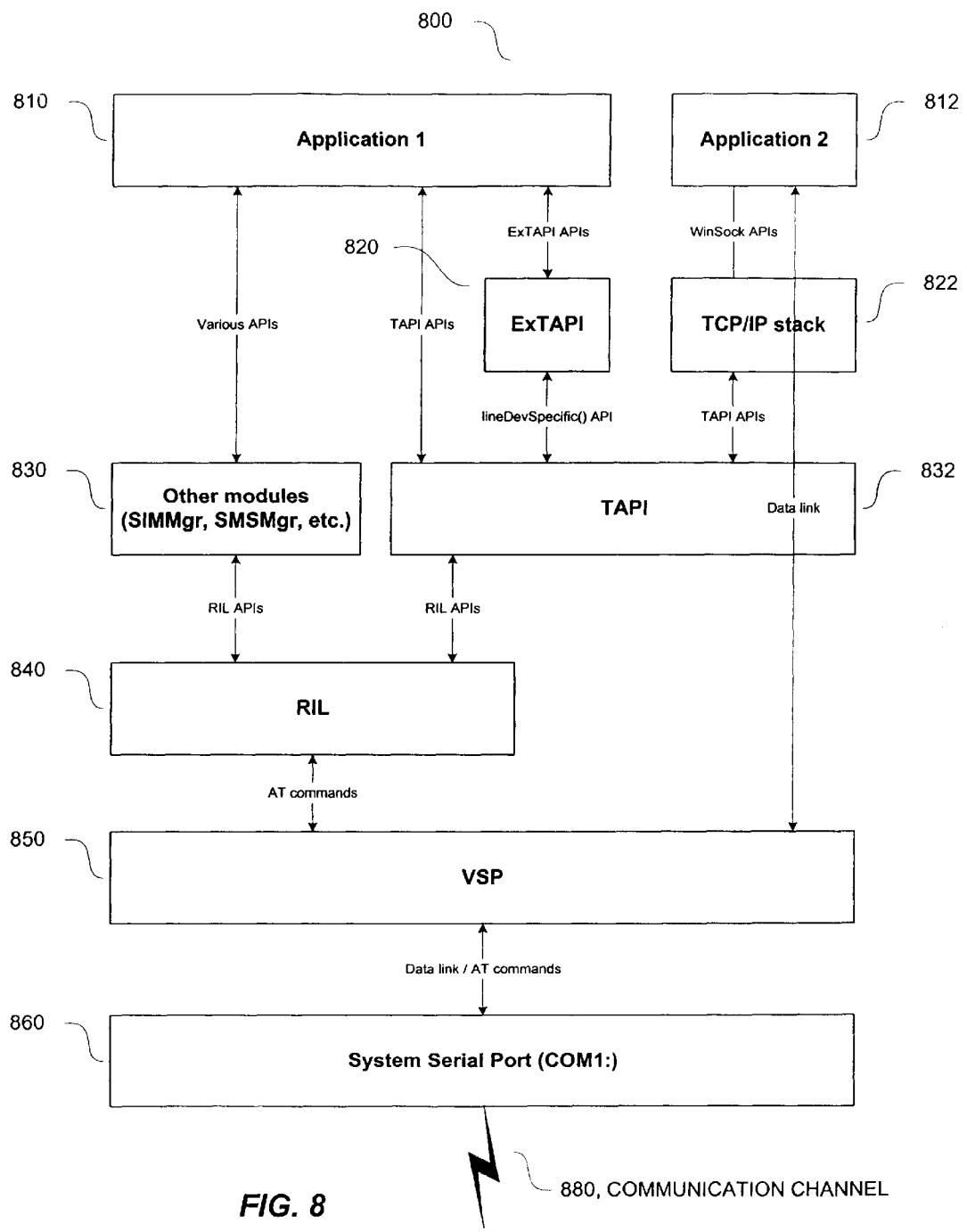
FIG. 8 is block diagram illustrating various functional components in another exemplary serial port system.

Another example of a system using a virtual serial port is shown in FIG. 8. As shown in the figure, application programs communicate through an API to the RIL. More specifically, a first application program (810, Application 1) communicates with the RIL through various APIs such as, for example, a telephony API (TAPI), an extended telephony API (ExTAPI), as well as others. TAPI connections are communicated through a TAPI driver (832) to the RIL (840). ExTAPI connections communicate through an ExTAPI driver (820), which in turn communicates with a TAPI driver (832) to the RIL (840). Other types of messages are communicated through specific drivers (e.g., SMS driver, SIM driver as well as others) to the RIL (840). Another application (812, Application 2) communicates through a TCP/IP stack (822), which in turn communicates with the TAPI driver (832) to the RIL (840).

As discussed previously, the RIL (840) communicates with the VSP (850) via command messages such as, for example, AT commands. The VSP (850) provides either a command message (e.g., AT commands) to the system serial port (860, COM1) or forwards data to and from an application to the system serial port (860).

The first application (810) calls an API to retrieve information from the serial port. An intermediate module (e.g., TAPI) translates this into another format that is suitable for the RIL (840). The RIL (840) translates the request into a command message that is suitable for the serial port (860), and sends the command message to the VSP (850). When a call not currently in progress, the command message is sent directly from the VSP (850) to the serial port (860). The System Serial Port (860) executes the command and issues a response that is propagated back up to the requesting application (810) in the reverse order.

For Example, Application 1 calls ExTAPI API lineGetCurrentOperator( ) to retrieve the name of the wireless operator in a cellular telephone. The ExTAPI interface translates this call into a TAPI API lineDevSpecific( ). The TAPI interface translates this into a call to RIL API RIL_GetOperatorName( ). The RIL translates this into an AT Command AT+COPS?, which is sent through the VSP to the System Serial Port.

When Application 2 (812) calls an API to establish data communication, an API call to open a TCP/IP connection is propagated down to the RIL through the TCP/IP stack (822) and the TAPI interface (832). The RIL sends a command to the VSP requesting a connection, to which the VSP returns a virtual handle that is propagated back to the application (812). Once the virtual handle is received by the application (812), a data link is established between the VSP (850) and the application (812). The application (812) may then begin reading and writing data to the virtual handle without interruption by the RIL. If Application 1 (810) requests information from the serial port while the data link is active, the information request flows from the application to the VSP (850) as described previously. However, after the VSP receives the request, it performs the heuristic calculation previously described to determine when to send the request to the serial port. At the appropriate time interval, the DTR line is set low to temporarily disable the serial port connection, and the command message (e.g. AT+COPS?) is processed. After the VSP sends the reply (thereby completing the command) from the serial port to the RIL, the serial port is re-connected to the data link by sending an appropriate command to the serial port (e.g. ATO).

Figure 9:
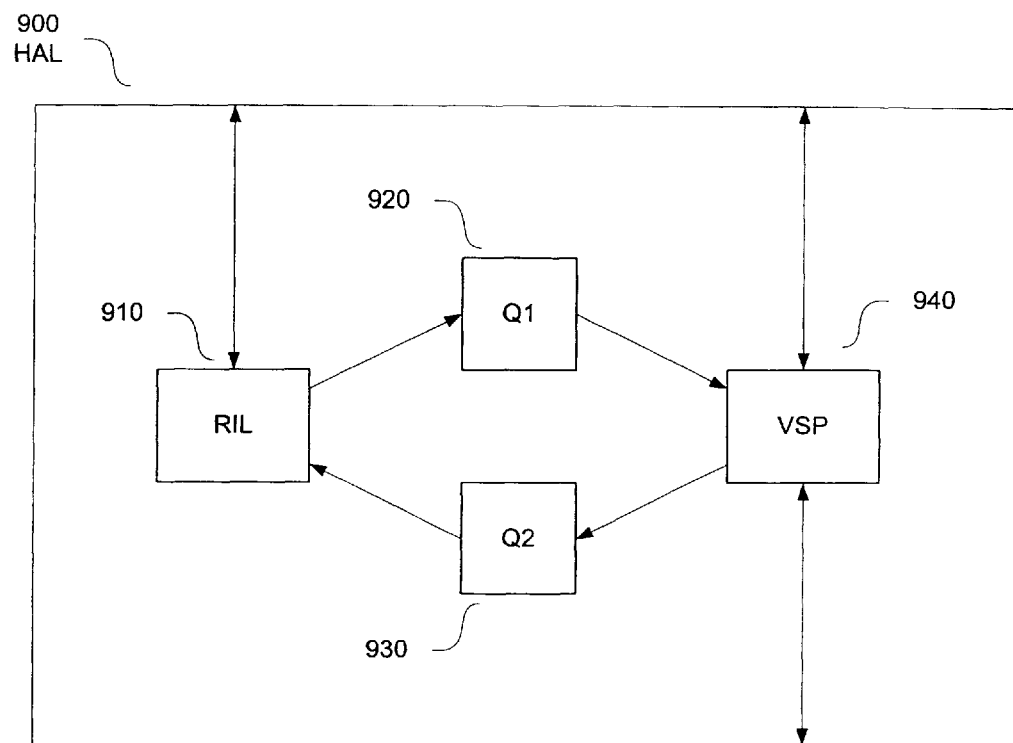
FIG. 9 is a functional block diagram of an exemplary hardware abstraction layer.

As discussed previously a queue may be utilized to communicate between the RIL and the VSP. FIG. 9 illustrates an example implementation of the HAL that includes messaging queues. Other message queues are also possible and within the purview of ordinary skill in the art.

As shown in FIG. 9, the HAL (900) includes a RIL (910), a first queue (Q1, 920), a second queue (Q2, 930) and a VSP (940). The RIL (910) sends command messages to the first queue (920). The VSP periodically retrieves a command message from the first queue (920) for processing. The selected command message is sent to the serial port (not shown). The serial port sends a reply message to the VSP (940) that is subsequently sent to the second queue (930). The RIL (910) retrieves the reply message from the second queue (930).

Figure 10:
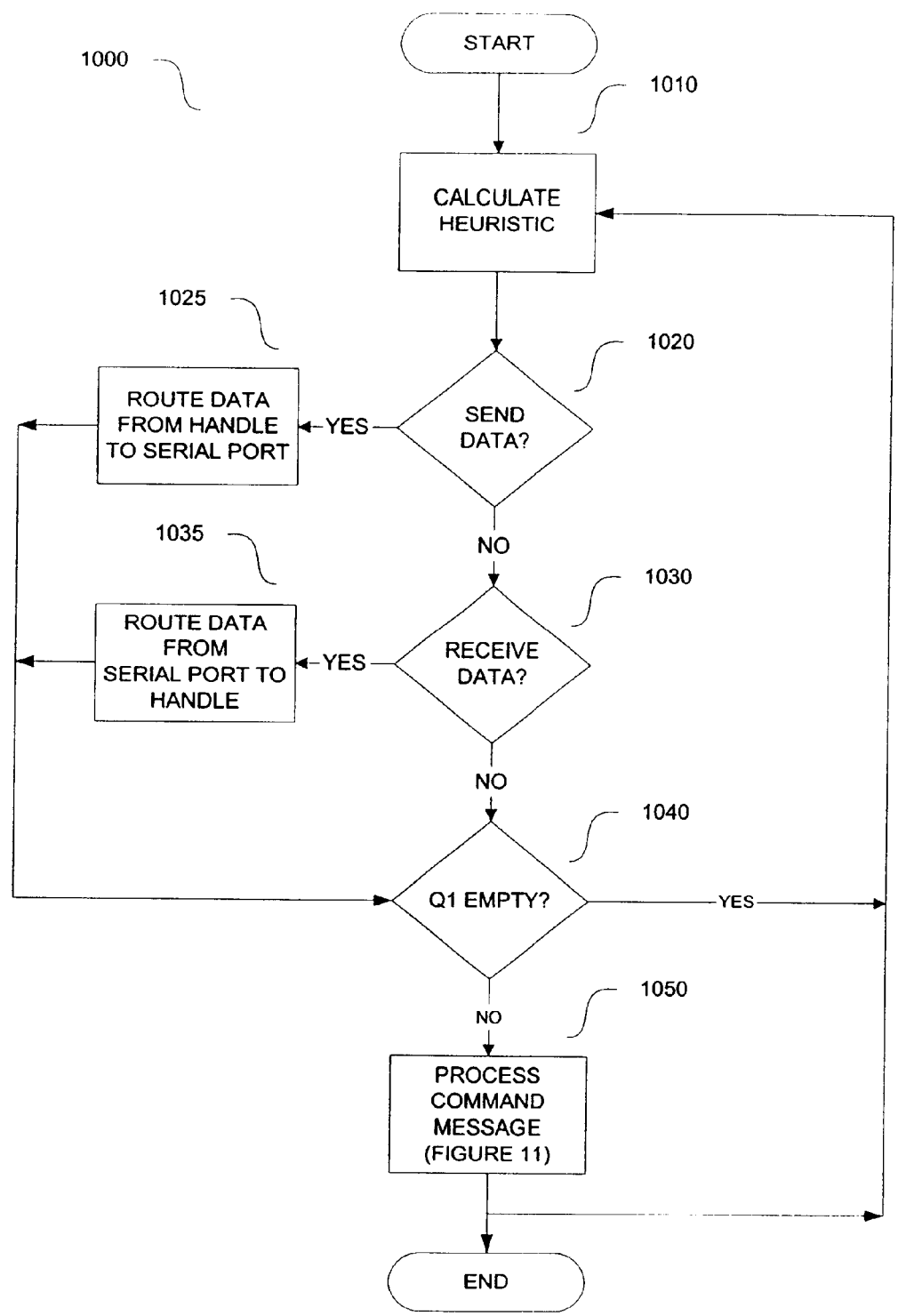
FIG. 10 is a flow diagram illustrating the operation of an exemplary virtual serial port.

One example of processing in the VSP (1000) is shown in FIG. 10. At block 1010, the VSP calculates a heuristic based on information as discussed previously. The heuristic indicates a maximum interrupt time for the data communication connection. Alternatively, the heuristic may be calculated once when the connection is first established, or at other times as may be necessary based on network loading. Then, the VSP determines if there is any data to be sent to the serial port at block 1020. When data that corresponds to a virtual handle is to be routed, processing proceeds to block 1025 where the VSP routes a block (or multiple blocks) of the data to the serial port. Alternatively, processing proceeds to block 1030.

At block 1030, the VSP determines if there is any data to be received from the serial port. If data is awaiting receipt at the serial port, then processing proceeds to block 1035 where the data at the serial port is routed to the virtual handle. Alternatively, processing proceeds to block 1040. Processing also proceeds to block 1040 from blocks 1025 and 1035.

At block 1040, the VSP examines the first queue (Q1) to determine if a command message is awaiting processing. If command messages are in the first queue, then processing proceeds to block 1050 where at least one command message is processed. Alternatively, processing continues to block 1010. Processing also continues to block 1010 from block 1050.

Figure 11:
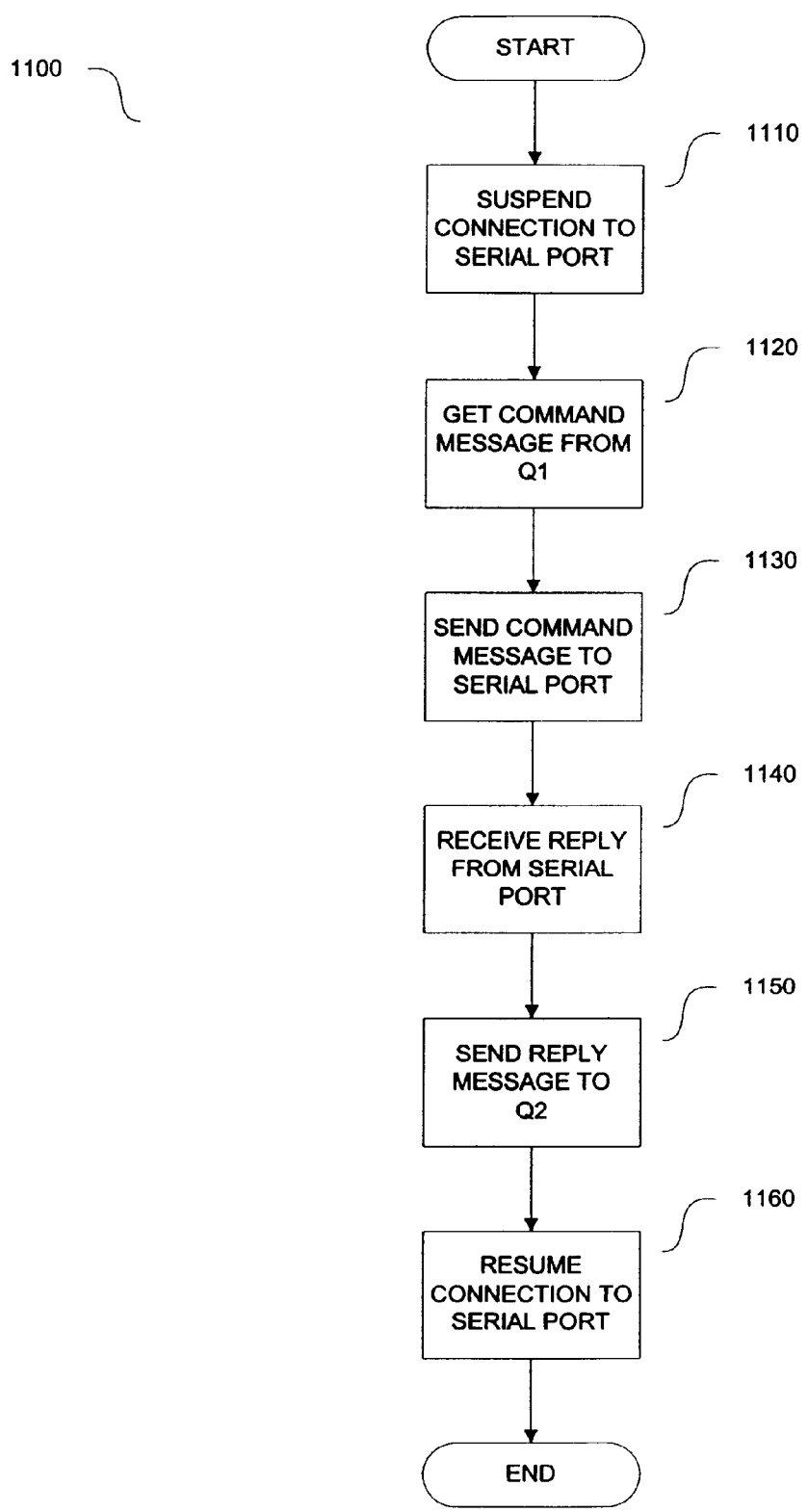
FIG. 11 is a flow diagram illustrating the processing of command messages in a virtual serial port.

FIG. 11 illustrates one example of command message processing (1100) for block 1050 in FIG. 10. As shown in FIG. 11, the data communication connection to the serial port is suspended at block 1110. When no connection is active this block 1110 is unnecessary. Proceeding to block 1120, a command message is retrieved from the first queue (Q1). When the queue has multiple messages contained therein, any reasonable criterion may be used to select one or more of the messages. For Example, in one embodiment of the invention, a priority based queue it utilized where the highest priority is processed first.

Proceeding to block 1130, the selected command message is sent to the serial port by the VSP. The VSP then awaits a reply message from the serial port, which is received at block 1140. The reply message is then sent to the second queue (Q2) at block 1150. Finally, at block 1160, the data communication connection to the serial port is resumed. When no connection is active, step 1160 is unnecessary.

Figure 12:
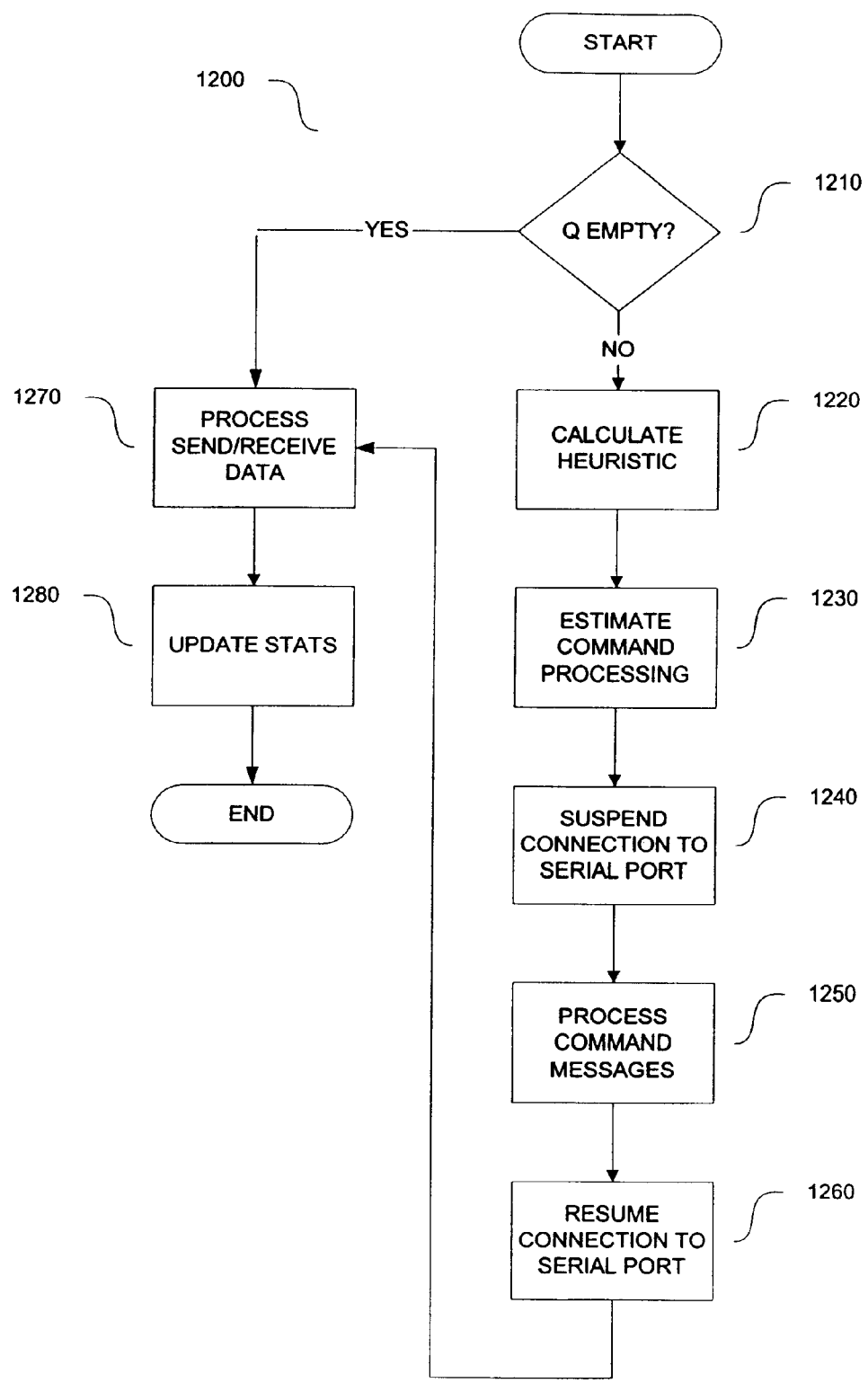
FIG. 12 is another flow diagram illustrating the operation of another exemplary virtual serial port, in accordance with the present invention.

Another example of VSP processing (1200) is shown in FIG. 12. The processing (1200) is executed once each time quantum. In this example, the virtual serial port determines if the command message queue is empty at block 1210. If the command message queue is empty we continue processing at block 1220, otherwise we proceed to block 1270. At block 1220 the heuristic calculation previously discussed is executed to determine the maximum time interval that a data connection can be suspended.

Proceeding from block 1220 to block 1230, the command queue is analyzed to estimate and select commands in the queue that can be processed in the suspension time interval. To determine the amount of time it takes for each command in the queue to be processed, another calculation may be performed based on past statistical history. Alternatively, a lookup table may be used where each entry in the lookup table corresponds to an average processing time for a given command. Using the maximum suspension time interval from block 1220 together with the command processing time estimations, commands are selected for processing from the command queue. Processing proceeds from block 1230 to block 1240.

The connection to the serial port is suspended at block 1240, permitting the selected command messages from block 1230 to be processed at block 1250. After the selected command messages are completely processed, processing continues at block 1260 where the serial port connection is resumed. From block 1260, processing proceeds to block 1270.

At block 1270, the entire remaining time quantum is used to process the send and receive data for the application program(s). Since processing proceeds from block 1210 to block 1270 when the queue is empty, the entire time quantum may be available for handling sending and receiving data between the application program(s) and the serial port. Processing proceeds from block 1270 to block 1280.

At block 1280, statistical information for the VSP is updated. The statistical data may include information corresponding to the amount of time each command requires for processing, information related to the heuristic calculations and processing times, as well as any other statistics.

It is possible that none of the commands in the queue can be executed within a given quantum of time (e.g., if the command queue contains a single command and that command would take longer to execute than the maximum suspension time interval from block 1220). In this case, no commands may be processed (i.e., blocks 1240, 1250, and 1260 are skipped). Additionally, in this case, to ensure that each command is eventually processed, at least one command in the command queue is aged. Aging can be accomplished by gradually reducing the expected execution time for the command, as well as other methods. Once the age of a particular command message reaches a suitable age, the message should be processed even though it may not have been completed within the calculated maximum suspension time interval. In this way, each command message is processed.

The above-described virtual serial port is useful in mobile electronic devices that have multiple functions such as telephone communications and other Internet-based applications. For example, web browsing, email and other applications that communicate using TCP/IP can be featured in a mobile electronic device. Periodic command messages are communicated to the serial port in the mobile electronic device by suspending the data communication session for a time period that is based on a heuristic calculation. By multiplexing between the active communication connections in the data-mode, and a command-mode, multiple functions can be accomplished on the same mobile device without terminating the data communication session. The heuristic approach helps ensure that the data communication session is not interrupted for a long time interval resulting in lost packets of data due to buffer overrun. The parameter for the time quantum and other parameters may be adjusted to account for the finite buffer size present in the physical serial port.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A system for managing a port, comprising an interface that establishes a data-connection to the port, another interface that receives command-requests and stores command-messages in a buffer, and the interface periodically suspends the established data-connection with the port when command-messages are located in the buffer wherein the interface selectively sends command-messages from the buffer to the port and resumes the connection with the port within a prescribed time interval, wherein the prescribed time interval is determined by a heuristic calculation.

2. A system as in claim 1, wherein the heuristic calculation is based upon at least one of an effective air bit rate, a software-to-module bit rate, and a time quantum.

3. A system as in claim 1, wherein the heuristic calculation includes a time quantum that is dynamically adjusted.

4. A system as in claim 1, wherein the heuristic calculation is calculated at least during a power up condition.

5. A system as in claim 1, wherein the heuristic calculation is calculated at a predetermined time interval.

6. A system as in claim 1, wherein the interface selects command-messages from the buffer based upon one of a weighted priority that is associated with each entry in the buffer, a first-in first-out criteria, and a last-in first-out criteria.

7. A system method as in claim 1, wherein the port includes a receive buffer with a finite size, the receive buffer receiving data while the data-connection is suspended, and the heuristic calculation accounts for the finite size of the receive buffer.

8. A system as in claim 1, wherein the interface generates a virtual handle to the port when the data-connection is established, and data-communication is accomplished through the virtual handle.

9. A system as in claim 1, wherein the data-connection is suspended by setting a DTR control in the port low, and the data-connection is resumed by sending a command-message to the port.

10. A method of managing a port, comprising:
    generating a virtual handle when a data-connection is established;
    switching between a data-mode and a command-mode based upon a heuristic calculation;

routing data between the port and the virtual handle when the operating mode is the data-mode;

placing received command-messages in a buffer;

selecting at least one command-message from the buffer; and sending the selected at least one command-message to the port when the operating mode is the command-mode.

11. The method of claim 10, wherein the data connection is active when the operating mode is a data-mode, and the data connection is suspended when the operating mode is a data-mode.

12. The method of claim 10, further comprising:

receiving a command-request from an application; and formatting the command-request into a command-message.

13. The method of claim 10, further comprising:

receiving a reply-message from the port when the operating mode is the command-mode; and sending the reply-message to an application when the operating mode is the command-mode.

14. The method of claim 10, further comprising:

receiving a reply-message from the port when the operating mode is the command-mode;

sending the reply-message to another buffer when the operating mode is the command-mode; and switching from the command-mode to the data-mode after the reply-message is sent to the other buffer.

15. The method of claim 10, wherein the port is part of a portable electronic device.

16. A computer readable medium having computer executable instructions for managing a port connection, comprising:

activating a call-mode when a data-connection is established;

deactivating the call-mode when the data-connection is terminated;

determining a time interval based on a heuristic calculation;

routing data between an application and the port during the time interval when the operating mode is the call-mode;

suspending the data-connection at the end of the time interval when the operating mode is the call-mode;

activating a command-mode when the call-mode is deactivated;

activating the command-mode when the data-connection is suspended;

processing command-messages that are awaiting processing when the operating mode is the command-mode; and resuming a suspended data connection after completing the processing of command messages when the call-mode is active.

17. A computer readable medium as in claim 16, wherein the heuristic calculation is based upon at least one of a data transfer speed associated with the port, a communication channel speed, a buffer length associated with the port, and a time quantum.

18. A computer readable medium as in claim 17, wherein the maximum time interval that an active call can be suspended is associated with a ratio between the data transfer speed and the communication channel speed.

19. A system for managing a serial port in a portable device, comprising:

means for activating a call-mode when a data-connection is established;

means for deactivating the call-mode when the data-connection is terminated;

means for receiving a command-request;

means for converting the command-request to a command-message;

means for sending the command-message to the serial port when operating in a command-mode;

means for routing data between an application and the serial port when operating in a data-mode;

means for selecting the command-mode when the call-mode is inactive;

means for selecting the data-mode when the call-mode is active; and means for switching between the data-mode and the command-mode based on a heuristic calculation when the call-mode is active.

20. A system as in claim 19, wherein the means for switching, further comprising:

means for suspending the data-connection when the call mode is active and the command-mode is selected; and means for resuming the suspended data-connection when the data-mode is selected, where the heuristic calculation determines a maximum time interval for which the data-connection can be suspended based on a ratio between an effective air bit rate and a software to module bit rate.

* * * * *